United States Patent
Na

(10) Patent No.: US 12,314,565 B2
(45) Date of Patent: May 27, 2025

(54) STORAGE DEVICE, HOST DEVICE AND COMPUTING SYSTEM

(71) Applicant: SK hynix Inc., Icheon-si (KR)

(72) Inventor: Hyeong Ju Na, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 50 days.

(21) Appl. No.: 18/493,575

(22) Filed: Oct. 24, 2023

(65) Prior Publication Data

US 2024/0393949 A1 Nov. 28, 2024

(30) Foreign Application Priority Data

May 24, 2023 (KR) .................. 10-2023-0066857

(51) Int. Cl.
*G06F 3/06* (2006.01)

(52) U.S. Cl.
CPC ............ *G06F 3/061* (2013.01); *G06F 3/0647* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 11,586,385 B1 * | 2/2023 | Lercari | G06F 1/30 |
| 2014/0059277 A1 * | 2/2014 | Chung | G06F 3/0604 |
| | | | 711/103 |
| 2016/0378353 A1 * | 12/2016 | Schmisseur | G06F 3/0631 |
| | | | 711/114 |
| 2019/0332298 A1 * | 10/2019 | Madabhushi | G06F 3/0679 |
| 2021/0117320 A1 | 4/2021 | Mahesh | |
| 2021/0223994 A1 * | 7/2021 | Kanno | G06F 3/0679 |
| 2021/0255803 A1 * | 8/2021 | Kanno | G06F 3/061 |
| 2021/0405900 A1 * | 12/2021 | Kurita | G06F 3/0604 |
| 2022/0229555 A1 | 7/2022 | Sela et al. | |
| 2022/0291860 A1 * | 9/2022 | Springberg | G06F 3/0604 |
| 2023/0359391 A1 * | 11/2023 | Uttarwar | G06F 3/0656 |
| 2024/0070033 A1 * | 2/2024 | Han | G06F 3/061 |
| 2024/0377987 A1 * | 11/2024 | Sharma | G06F 3/0659 |

FOREIGN PATENT DOCUMENTS

KR 10-2020-0107716 A 9/2020

* cited by examiner

*Primary Examiner* — Stephanie Wu

(57) ABSTRACT

In an embodiment of the disclosed technology, a host device may control an operation of writing data to a plurality of types of memory cells included in a memory, through booster logic units respectively corresponding to the plurality of types of memory cells, and a timing thereof. It is possible to prevent performance of a device from degrading due to differences in characteristics of operations in which data are written to the plurality of types of memory cells, and improve performance and efficiency of an operation of writing data to a plurality of memory cells.

20 Claims, 9 Drawing Sheets

STORAGE DEVICE, HOST DEVICE AND COMPUTING SYSTEM

CROSS-REFERENCE TO RELATED APPLICATION

The present application claims priority under 35 U.S.C. § 119(a) to Korean Patent Application No. 10-2023-0066857 filed in the Korean Intellectual Property Office on May 24, 2023, which is incorporated herein by reference in its entirety.

BACKGROUND

1. Technical Field

Various embodiments of the disclosed technology generally relate to a storage device, a host device, and a computing system.

2. Related Art

A computing system may include a storage device which stores data and a host device which controls the storage device. The host device may write data to or erase data in the storage device, and may read data from the storage device.

The storage device may include a memory which includes a plurality of memory cells. Types of the plurality of memory cells may vary depending on the size of data that can be stored in each memory cell.

The characteristics of an operation of writing data to the plurality of memory cells may be different depending on the type of the plurality of memory cells. As an operation of writing data to various types of memory cells is performed, operational performance of the storage device may be degraded.

SUMMARY

Various embodiments of the disclosed technology are directed to providing measures capable of improving performance of an operation of writing data to a memory that is included in a storage device and includes various types of memory cells.

In an embodiment, a computing system may include: a storage device including a memory including a plurality of first memory cells which store data smaller than N (N≥2) bits and a plurality of second memory cells which store N-bit data; and a host device configured to use a first booster logic unit which is set to correspond to the plurality of first memory cells and a second booster logic unit which is set to correspond to the plurality of second memory cells, and control an operation of writing data to the plurality of first memory cells and the plurality of second memory cells on the basis of a size available in at least one of the first booster logic unit and the second booster logic unit.

In an embodiment, a host device may include: a first booster logic unit set to correspond to a plurality of first memory cells which are included in a memory and store 1-bit data; a second booster logic unit set to correspond to a plurality of second memory cells which are included in the memory and store N (N>1)-bit data; a third booster logic unit set to correspond to a plurality of third memory cells which are included in the memory and store M (M>N)-bit data; and a booster logic control module configured to control an operation of writing data to the plurality of first memory cells, the plurality of second memory cells and the plurality of third memory cells, on the basis of a size available in at least one of the first booster logic unit, the second booster logic unit and the third booster logic unit.

In an embodiment, a storage device may include: a memory including a plurality of first memory cells which store data smaller than N (N≥2) bits and a plurality of second memory cells which store N-bit data; and a controller configured to control an operation of writing data to the plurality of first memory cells and the plurality of second memory cells, according to a command transmitted by a host device using a first booster logic unit which is set to correspond to the plurality of first memory cells and a second booster logic unit which is set to correspond to the plurality of second memory cells.

An operation in which data written to the plurality of first memory cells is migrated to the plurality of second memory cells may be performed according to an operation in which the host device migrates data written to the first booster logic unit corresponding to the plurality of first memory cells to the second booster logic unit corresponding to the plurality of second memory cells.

According to the embodiments of the disclosed technology, it is possible to reduce performance degradation in an operation of writing data to a memory that includes various types of memory cells, as well as to improve operational performance of a storage device that includes the memory.

DETAILED DESCRIPTION

Figure 1:
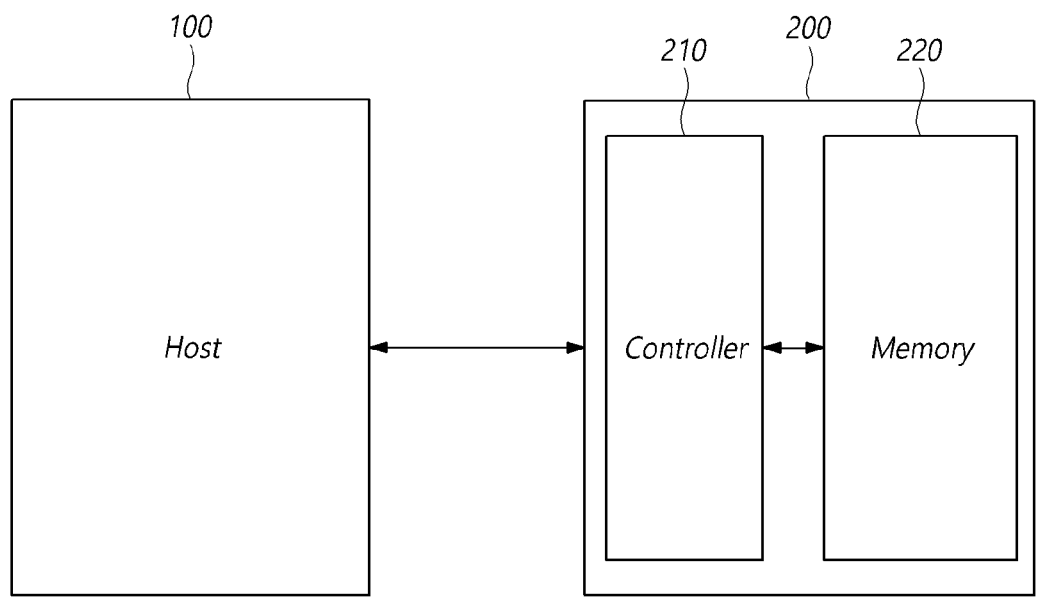
FIG. 1 illustrates a computing system according to an embodiment of the disclosed technology.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 illustrates a computing system according to an embodiment of the disclosed technology.

Referring to FIG. 1, the computing system may include a host device 100 and a storage device 200.

The host device 100 and the storage device 200 may communicate with each other using a specific protocol.

For example, the host device 100 and the storage device 200 may communicate through at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol and an IDE (integrated drive electronics) protocol, but the interface protocols are not limited thereto.

The host device 100 may control the storage device 200. The host device 100 may store or erase data in the storage device 200. Also, the host device 100 may read data from the storage device 200.

The host device 100 may include a file system that divides a storage area of the storage device 200 and manages storing data in the storage area of the storage device 200. The host device 100 may include a host memory which is loaded with file data provided from a user application to store data in the storage device 200. The host memory may be a volatile memory such as a DRAM, an SDRAM, a DDR SDRAM, an LPDDR SDRAM, a garbled RAM (GRAM), or the like, but is not limited thereto.

The storage device 200 may include a controller 210 and a memory 220.

The controller 210 may control an operation of the memory 220 according to a command input from the host device 100. The controller 210 may also control the operation of the memory 220 according to a command generated inside the controller 210.

The controller 210 may control program, read, and erase operations for the memory 220. Also, the controller 210 may control a background operation including at least one of garbage collection, wear leveling, read reclaim, and bad block management. As the case may be, at least a part of the background operation may not be performed by the controller 210 due to an operation performed by the host device 100.

The controller 210 may include a host interface for communicating with the host device 100 and a memory interface for communicating with the memory 220.

The controller 210 may include a control circuit that controls the operations of the memory 220 by performing overall control operations of the controller 210. The control circuit may include a processor, a working memory, and so forth, and may optionally include an error detection and correction circuit.

The processor may perform the function of a flash translation layer (FTL). The processor may translate a logical block address provided by the host device 100 into a physical block address through the flash translation layer. The flash translation layer may receive a logical block address and translate the logical block address into a physical block address using a mapping table.

The processor may execute firmware to control the operation of the controller 210. In order to control overall operations of the controller 210 and perform logical operations, the processor may load and execute (or drive) firmware in the working memory upon booting.

For example, the memory 220 may be implemented into any of various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), and the like.

The memory 220 may be implemented into a three-dimensional array structure. The embodiment of the disclosed technology may be applied to not only a flash memory in which a charge storage layer is configured by a conductive floating gate but also a charge trap flash (CTF) in which a charge storage layer is configured by an insulating film.

The memory 220 may receive a command and an address from the controller 210. The memory 220 may access an area which is selected by the address in a memory cell array. The memory 220 may perform an operation indicated by the command, on the area selected by the address.

The memory 220 may include the memory cell array including a plurality of memory cells which store data. The memory cell array may include a plurality of memory blocks.

A plurality of word lines and a plurality of bit lines may be disposed in the plurality of memory blocks. Each of the plurality of memory blocks may include a plurality of memory cells. The plurality of memory cells may be constituted by nonvolatile memory cells which have a vertical channel structure.

The memory cell array may be configured as a two-dimensional structure, or as the case may be, may be configured as a three-dimensional structure.

Each of the plurality of memory cells included in the memory cell array may store at least 1-bit data. For instance, each of the plurality of memory cells included in the memory cell array may be a signal level cell (SLC) which stores 1-bit data. For another instance, each of the plurality of memory cells included in the memory cell array may be a multi-level cell (MLC) which stores 2-bit data. For still another instance, each of the plurality of memory cells included in the memory cell array may be a triple level cell (TLC) which stores 3-bit data. For yet another instance, each of the plurality of memory cells included in the memory cell array may be a quad level cell (QLC) which stores 4-bit data. For still yet another instance, as the case may be, the memory cell array may include a plurality of memory cells each of which stores 5 or more-bit data.

The number of bits of data stored in each of the plurality of memory cells may be dynamically determined. For example, a single level cell which stores 1-bit data may be changed to a triple level cell which stores 3-bit data or a quad level cell which stores 4-bit data.

One part of the plurality of memory cells may be single level cells each of which stores 1-bit data, and the other part of the plurality of memory cells may be triple level cells each of which stores 3-bit data. In the case of a single level cell, capacity for storing data is small, but speed of storing data may be fast. In the case of a triple level cell, capacity for storing data is large, but speed of storing data may be slow or stability may be low. When these various types of memory cells are mixed to constitute a memory cell array, performance of an operation of writing data to the memory cell array may degrade.

Embodiments of the disclosed technology may enable the host device 100 to control an operation of storing data for each type of memory cells included in the memory 220, and thus, may provide measures capable of improving operational performance of the memory 220 including various types of memory cells.

Figure 2:
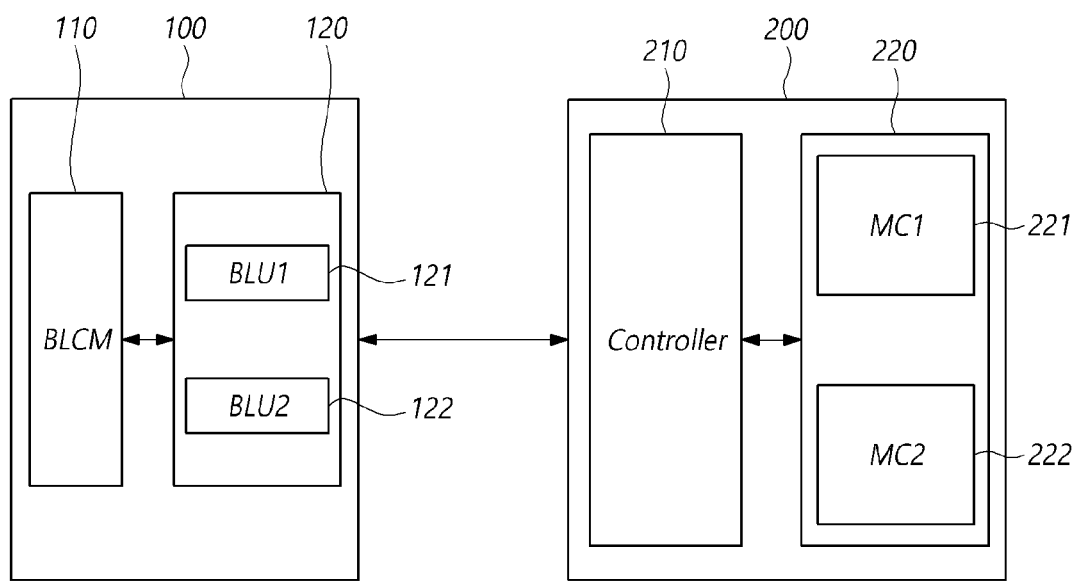
FIG. 2 illustrates a case where a host device sets and uses a booster logic unit according to an embodiment of the disclosed technology.
Figure 3:
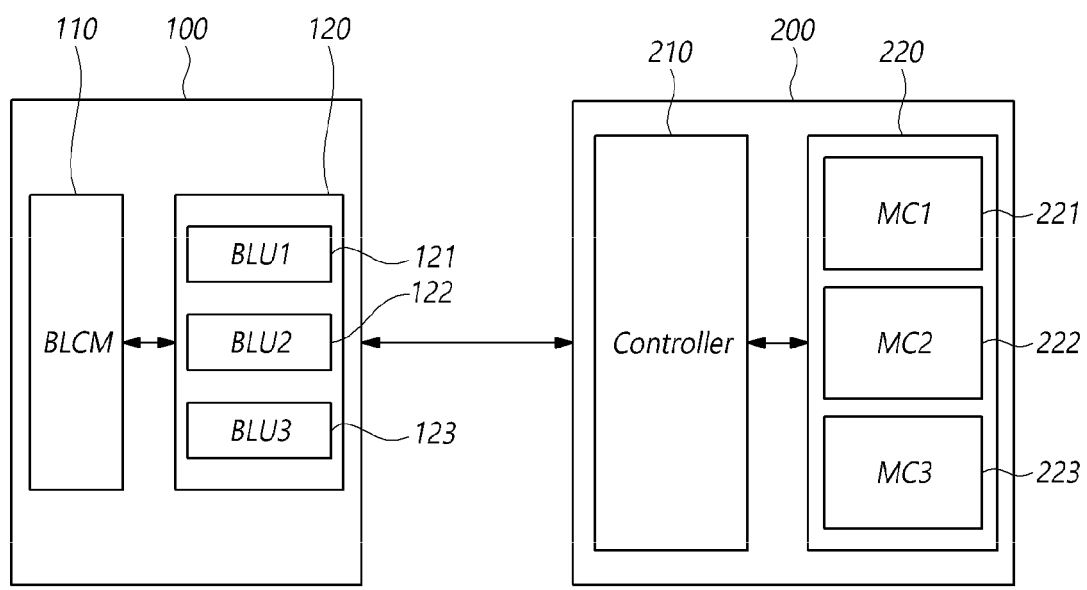
FIG. 3 illustrates a case where a host device sets and uses a booster logic unit according to another embodiment of the disclosed technology.

FIG. 2 illustrates a case where a host device 100 of a computing system sets and uses a booster logic unit 120 according to an embodiment. FIG. 3 illustrates a case where a host device 100 of a computing system sets and uses a booster logic unit 120 according to another embodiment.

Referring to FIG. 2, the host device 100 may set and use a booster logic control module (BLCM) 110 and at least one booster logic unit 120. FIG. 2 exemplarily shows a case where the host device 100 sets and uses a first booster logic unit (BLU1) 121 and a second booster logic unit (BLU2) 122.

A storage device 200 may include a memory 220 which includes a plurality of memory cells. The storage device 200 may include a controller 210 which controls operations of the memory 220.

The memory 220 may include a plurality of first memory cells (MC1) 221 and a plurality of second memory cells (MC2) 222.

Each of the plurality of first memory cells 221 may store K-bit data. Each of the plurality of second memory cells 222 may store N-bit data, N being equal to or greater than 2, K being smaller than N. The N bits may represent the maximum capacity of data that can be stored by each memory cell included in the memory 220.

For example, each of the plurality of first memory cells 221 may store 1-bit data. Each of the plurality of second memory cells 222 may store data with a size larger than 1 bit, such as 2 bits, 3 bits, or 4 bits.

The host device 100 may set and use a booster logic unit 120 corresponding to a part of the plurality of memory cells included in the storage device 200.

The booster logic unit 120 may be set to correspond to at least two memory cells or at least two memory blocks each including at least two memory cells. At least two booster logic units 120 may be set. The at least two booster logic units 120 may be independent of each other, and may not overlap with each other. A storage area included in the storage device 200 may be divided to correspond to the respective at least two booster logic units 120.

The booster logic unit 120 may be set according to a logic unit setting parameter which is transmitted by the host device 100.

The logic unit setting parameter may include information indicating whether the booster logic unit 120 is set or not, a number of the booster logic unit 120, a size of the booster logic unit 120, and so forth.

The logic unit setting parameter may further include information that indicates a type of memory cells corresponding to the booster logic unit 120. The type of each memory cell may be classified into a single level cell, a multi-level cell, a triple level cell, a quad level cell, or the like according to the number of bits stored in the memory cell.

The host device 100 may transmit the logic unit setting parameter that includes information indicating the type of memory cells to the storage device 200. According to the logic unit setting parameter, the booster logic unit 120 may be set to correspond to a specific type of memory cells among the plurality of memory cells in the memory 220.

For example, a booster logic unit 120 may be set to correspond to single level cells. Another booster logic unit 120 may be set to correspond to multi-level cells. A plurality of booster logic units 120 may be set to correspond to triple level cells, quad level cells, and so on, respectively.

Since the plurality of booster logic units 120 are set to correspond to memory cells according to different types, the host device 100 may control operations of the memory cells of different types using the plurality of booster logic units 120. That is, the host device 100 may control the memory cells according to the types of the memory cells.

For example, the host device 100 may set booster logic units 120 for the plurality of first memory cells 221 and the plurality of second memory cells 222 described above, and then control the operations of the first and second memory cells 221 and 222 using the booster logic units 120. The first booster logic unit 121 set by the host device 100 may correspond to the plurality of first memory cells 221. The second booster logic unit 122 set by the host device 100 may correspond to the plurality of second memory cells 222.

The first booster logic unit 121 and the second booster logic unit 122 may be set to correspond to different types of memory cells, respectively. Information indicating the type of memory cells included in the logic unit setting parameter used to set the first booster logic unit 121 may be different from information indicating the type of memory cells included in the logic unit setting parameter used to set the second booster logic unit 122.

The host device 100 may control a data write operation to the plurality of first memory cells 221 using the first booster logic unit 121. The host device 100 may control a data write operation to the plurality of second memory cells 222 using the second booster logic unit 122.

For example, the host device 100 may determine memory cells to which data is to be written, among the memory cells included in the memory 220, on the basis of sizes available in the first booster logic unit 121 and the second booster logic unit 122. When writing data in the memory 220, the host device 100 may control a data writing operation to be performed first on the first memory cells 221 that store 1-bit data and therefore exhibit better performance.

For example, the booster logic control module 110 of the host device 100 may check the available size of the first booster logic unit 121. The booster logic control module 110 may check whether the available size of the first booster logic unit 121 is larger than or equal to the size of data to be written.

When the available size of the first booster logic unit 121 is larger than or equal to the size of data to be written, the booster logic control module 110 may control the storage device 200 such that the data is written to at least a part of the plurality of first memory cells 221 included in the memory 220. The storage device 200 may perform the data writing operation on the first memory cells 221 of the memory 220 according to a command input by the host device 100.

When the available size of the first booster logic unit 121 is smaller than the size of data to be written, the booster logic control module 110 may check the available size of the second booster logic unit 122. The booster logic control module 110 may check whether the available size of the second booster logic unit 122 is larger than or equal to the size of data to be written.

When the available size of the second booster logic unit 122 is larger than or equal to the size of data to be written, the booster logic control module 110 may control the storage device 200 such that the data is written to at least a part of the plurality of second memory cells 222 included in the memory 220. The storage device 200 may perform the data writing operation on the second memory cells 222 of the memory 220 according to the command from the host device 100.

Alternatively, when the available size of the first booster logic unit 121 is smaller than the size of data to be written, the booster logic control module 110 may control, without checking the available size of the second booster logic unit 122, that the data is written to the second memory cells 222 of the memory 220. The number of the second memory cells 222 may be set to be greater than the number of the first memory cells 221.

Since data writing operations to the first memory cells 221 and second memory cells 222 of different types are performed under the control of the host device 100, compared to a case where the data writing operations are performed under the control of the controller 210 of the storage device 200, the data write operations to the first memory cells 221 and the second memory cells 222 performed under the control of the host device 100 may be performed without limitations.

The host device 100 may control that, in the data writing operations using the first booster logic unit 121 corresponding to the first memory cells 221 and the second booster logic unit 122 corresponding to the second memory cells 222, data is preferentially written to the first memory cells 221 with better performance.

The host device 100 may control an operation of migrating data written to the first memory cells 221 to the second memory cells 222 using the first booster logic unit 121 and the second booster logic unit 122.

For example, the booster logic control module 110 of the host device 100 may control an operation of migrating data written to the first booster logic unit 121 to the second booster logic unit 122 during a preset period. The preset period may be an idle period or a period set in advance at regular intervals.

When a total size of data written to the first booster logic unit 121 is equal to or larger than a preset threshold value, the booster logic control module 110 may control the operation of migrating the data written to the first booster logic unit 121 to the second booster logic unit 122.

In correspondence to the operation of migrating the data written to the first booster logic unit 121 to the second booster logic unit 122, the operation of migrating data written to the first memory cells 221 to the second memory cells 222 may be performed. The data written to the first memory cells 221 may be migrated to the second memory cells 222 according to a command input by the host device 100 during a preset period such as an idle period.

The data written to the first memory cells 221 may be migrated to the second memory cells 222 without performing an operation such as garbage collection in the storage device 200. Since the data migrating operation of migrating the data written to the first memory cells 221 to the second memory cells 222, a start timing of the data migrating and a time period during which the data migrating operation is performed are controlled by the host device 100 rather than by the controller 210 of the storage device 200, it is possible to reduce the workload on the storage device 200.

As the case may be, the memory 220 may include at least three types of memory cells. The host device 100 may include a plurality of booster logic units 120 corresponding to the number of types of memory cells included in the memory 220.

For example, referring to FIG. 3, the host device 100 may include a booster logic control module 110 and a booster logic unit 120. The booster logic unit 120 may include a first booster logic unit 121, a second booster logic unit 122, and a third booster logic unit 123.

A memory 220 of a storage device 200 may include a plurality of first memory cells 221, a plurality of second memory cells 222, and a plurality of third memory cells 223.

For example, each of the plurality of first memory cells 221 may be a single level cell which stores 1-bit data.

Each of the plurality of second memory cells 222 may be a memory cell which stores N-bit data, N being greater than 1. For example, each of the plurality of second memory cells 222 may be a triple level cell which stores 3-bit data.

Each of the plurality of third memory cells 223 may be a memory cell which stores M-bit data, M being greater than N. For example, each of the plurality of third memory cells 223 may be a quad level cell which stores 4-bit data.

Hereinafter, it will be described as an example that the first memory cells 221 are single level cells, the second memory cells 222 are triple level cells, and the third memory cells 223 are quad level cells, but embodiments of the disclosed technology are not limited thereto.

The first booster logic unit 121 set by the host device 100 may correspond to the plurality of first memory cells 221. The second booster logic unit 122 set by the host device 100 may correspond to the plurality of second memory cells 222. The third booster logic unit 123 set by the host device 100 may correspond to the plurality of third memory cells 223.

The total capacities of the plurality of first memory cells 221, the plurality of second memory cells 222, and the plurality of third memory cells 223 corresponding to the first booster logic unit 121, the second booster logic unit 122, and the third booster logic unit 123, respectively, may be set according to a type of the storage device 200. Alternatively, as the case may be, the respective total capacities of the plurality of first memory cells 221, the plurality of second memory cells 222, and the plurality of third memory cells 223 may be adjusted by the host device 100.

For example, when the total capacity of the storage device 200 is 512 GB, the total capacity of the plurality of first memory cells 221 may be set to 16 GB, and the total capacity of the plurality of second memory cells 222 may be set to 30 GB. In this case, the maximum capacity of the plurality of first memory cells 221 may be 16*4=64 GB on the basis of quad level cells. The maximum capacity of the plurality of second memory cells 222 may be 30*(4/3)=40 GB on the basis of quad level cells. Accordingly, the total capacity of the plurality of third memory cells 223 may be 512−−64−40=408 GB. In this way, the total capacity of the first memory cells 221, the total capacity of the second memory cells 222, and the total capacity of the third memory cells 223 may be determined according to the first to third booster logic units 121 to 123 set by the host device 100.

The host device 100 may use the first booster logic unit 121, the second booster logic unit 122, and the third booster logic unit 123 like a memory hierarchy structure of a computer structure. For example, the host device 100 may control that the first booster logic unit 121 plays a role as a level 1 storage, the second booster logic unit 122 plays a role as a level 2 storage, and the third booster logic unit 123 plays a role as a cold storage.

The host device 100 may control data writing operations to the plurality of first memory cells 221, the plurality of second memory cells 222, and the plurality of third memory cells 223 using the first booster logic unit 121, the second booster logic unit 122, and the third booster logic unit 123, respectively.

The host device 100 may control a data writing operation to the plurality of memory cells included in the memory 220, on the basis of a size available in at least one of the first booster logic unit 121, the second booster logic unit 122, and the third booster logic unit 123.

For example, FIGS. 4 to 7 illustrate a method for the host device 100 of the computing system to control a data writing operation to memory cells using the booster logic unit 120 according to an embodiment of the disclosed technology.

Figure 4:
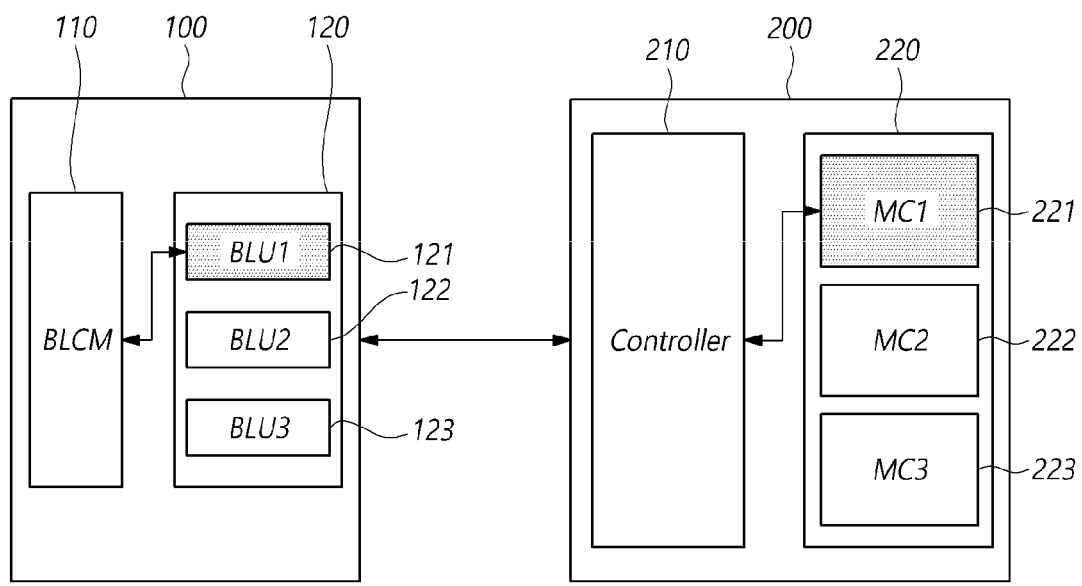
FIGS. 4 to 7 illustrate a method for the host device to control an operation of writing data to memory cells using the booster logic unit.
Figure 5:
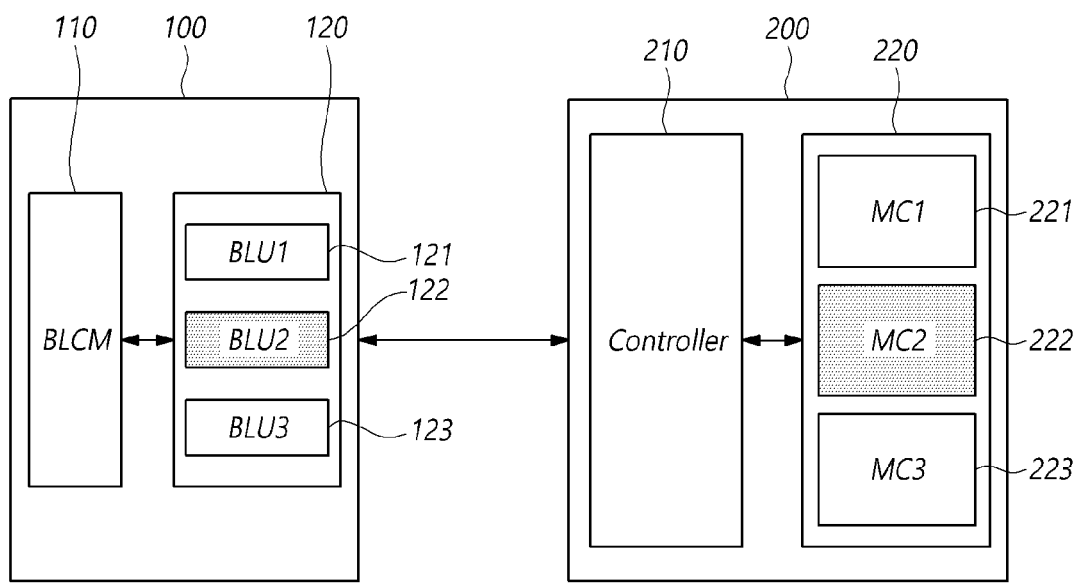
Figure 6:
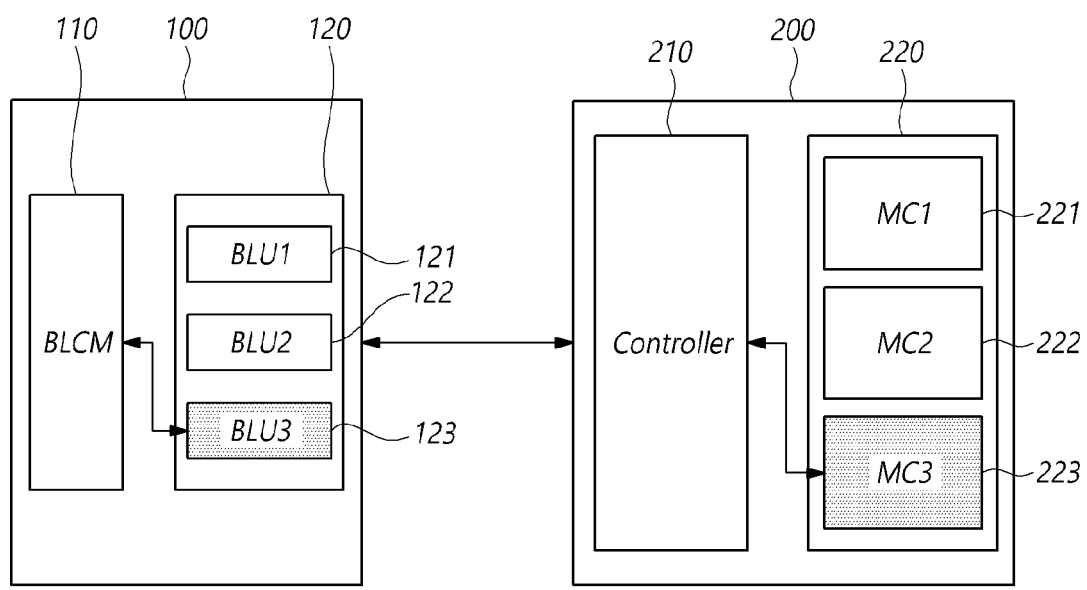

Referring to FIGS. 4 to 6, the booster logic control module 110 of the host device 100 may check whether a size available in the first booster logic unit 121 is larger than or equal to the size of data to be written.

When the size available in the first booster logic unit 121 is larger than or equal to the size of data to be written or larger than or equal to a size required on the basis of the size of data to be written, as shown in FIG. 4, the booster logic control module 110 may control the storage device 200 to perform the data writing operation on the plurality of first memory cells 221.

The host device 100 may transmit, to the controller 210 of the storage device 200, a command for writing the data to at least a part of the plurality of first memory cells 221 of the memory 220. Therefore, the data writing operation may be performed on the plurality of first memory cells 221 that are single level cells and therefore exhibit better performance.

When the size available in the first booster logic unit 121 is smaller than the size of data to be written or smaller than a predetermined reference value, the booster logic control module 110 may check a size available in the second booster logic unit 122.

When the size available in the second booster logic unit 122 is larger than or equal to the size of data to be written or larger than or equal to the size required on the basis of the size of data to be written, as shown in FIG. 5, the booster logic control module 110 may control the storage device 200 to perform the data writing operation on the plurality of second memory cells 222.

The host device 100 may transmit, to the controller 210 of the storage device 200, a command for writing the data to at least a part of the plurality of second memory cells 222 of the memory 220. Therefore, the data writing operation may be performed on the plurality of second memory cells 222 that are triple level cells.

When the size available in the second booster logic unit 122 is smaller than the size of data to be written or smaller than the predetermined reference value, the booster logic control module 110 may check a size available in the third booster logic unit 123.

When the size available in the third booster logic unit 123 is larger than or equal to the size of data to be written or larger than or equal to the size required on the basis of the size of data to be written, as shown in FIG. 6, the booster logic control module 110 may control the storage device 200 to perform the data writing operation on the plurality of third memory cells 223.

Alternatively, when the size available in the second booster logic unit 122 is smaller than the size of data to be written or smaller than the predetermined reference value, the booster logic control module 110 may control the storage device 200 to perform the data writing operation on the plurality of third memory cells 223 without checking the size available in the third booster logic unit 123.

Alternatively, when the capacity for storing data is more important than performance of a data writing operation to the storage device 200, the booster logic control module 110 may control that the data writing operation is preferentially performed on the plurality of third memory cells 223, using the third booster logic unit 123.

The host device 100 may control a data writing operation to each of different types of memory cells included in the memory 220 using a booster logic unit 120 corresponding to each of the different types of memory cells. The host device 100 may control the data writing operation to memory cells while improving performance of the data writing operation depending on a state in which the data is written to the memory cells.

Among the different types of memory cells, memory cells to which data is to be written may be controlled not by the storage device 200 but by the host device 100, and thus performance of the data writing operation to the storage device 200 may be improved by the host device 100.

In addition, a period during which data written to the different types of memory cells is migrated may be controlled by the host device 100.

Figure 7:
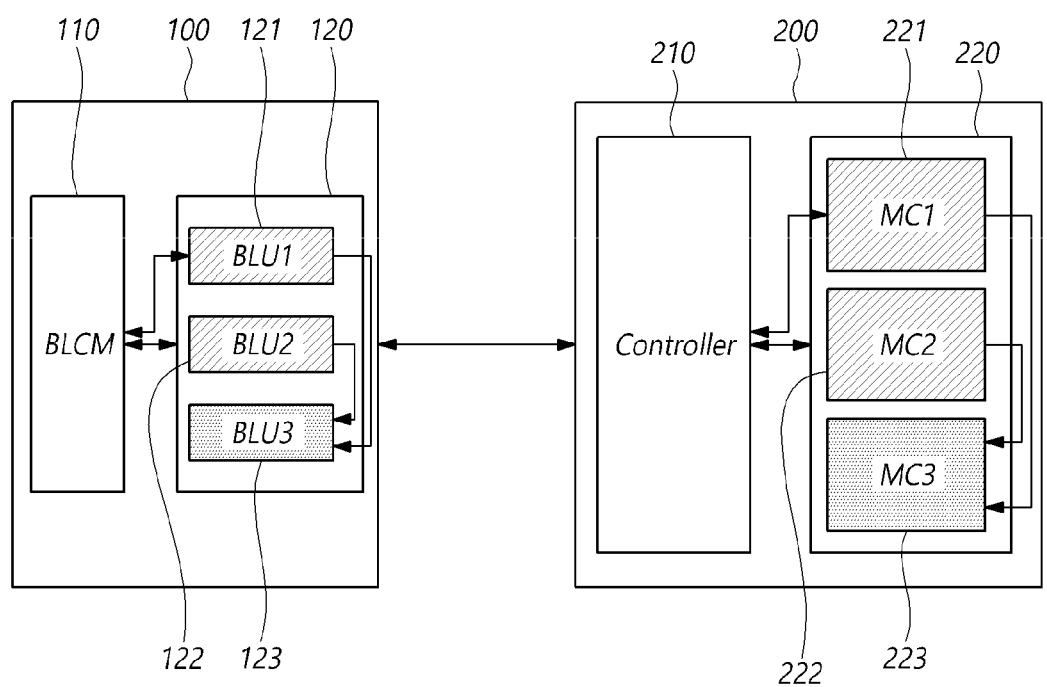

For example, referring to FIG. 7, the booster logic control module 110 of the host device 100 may check the total size of data written to the first booster logic unit 121. The booster logic control module 110 may check the total size of data written to the second booster logic unit 122.

When the total size of data written to the first booster logic unit 121 is equal to or larger than a preset threshold value, the booster logic control module 110 may migrate the data written to the first booster logic unit 121 to the third booster logic unit 123. As the data written to the first booster logic unit 121 is migrated to the third booster logic unit 123, data written to the first memory cells 221 of the memory 220 may also be migrated to the third memory cells 223. This data migration operation of the memory 220 may be performed in response to a write command input by the host device 100.

When the total size of data written to the second booster logic unit 122 is equal to or larger than the preset threshold value, the booster logic control module 110 may migrate the data written to the second booster logic unit 122 to the third booster logic unit 123. As the data written to the second booster logic unit 122 is migrated to the third booster logic unit 123, data written to the second memory cells 222 of the memory 220 may also be migrated to the third memory cells 223. This data migration operation of the memory 220 may be performed in response to a write command input by the host device 100.

Alternatively, during a preset period, the booster logic control module 110 may perform a data migration operation of migrating data written to either the first booster logic unit 121 or the second booster logic unit 122 to the third booster logic unit 123. For example, during an idle period, the booster logic control module 110 may perform the data migration operation.

Alternatively, the booster logic control module 110 may perform the data migration operation when a predetermined time interval has passed after the data is written to either the first booster logic unit 121 or the second booster logic unit 122. Alternatively, when the total size of data written to either the first booster logic unit 121 or the second booster logic unit 122 is equal to or larger than the preset threshold value and the predetermined time interval has passed, the booster logic control module 110 may perform the data migration operation.

Alternatively, prior to performing the data migration operation to the plurality of third memory cells 223, the booster logic control module 110 may perform a data writing operation, specifically writing data to either the first booster logic unit 121 or the second booster logic unit 122, until data of a size equal to or larger than a block size is written to either the first booster logic unit 121 or the second booster logic unit 122. After that, when the size of data written to either the first booster logic unit 121 or the second booster logic unit 122 is equal to or larger than the block size, the booster logic control module 110 may perform the data migration operation to the third booster logic unit 123. The block size may correspond to a size of a block including a part of the plurality of third memory cells 223.

This operation may be performed during an idle period. The operation of writing data to the third memory cells 223 that are quad level cells is performed in response to a command from the host device 100, and a user may not recognize performance degradation due to the operation of writing data to the quad level cells.

Since the host device 100 controls a data writing operation to memory cells of various types and a data migration operation between these different types of memory cells using the booster logic unit 120, the storage device 200 may perform only a write operation in response to a write command from the host device 100.

The storage device 200 may determine whether to perform a data writing operation to the first memory cells 221, which are single level cells, or to the third memory cells 223, which are quad level cells, based on a command received from the host device 100. Therefore, it may be possible to reduce the workload on the storage device 200 when performing the data write operation.

In addition, since the host device 100 controls the period during which data written to the first memory cells 221 is migrated to the third memory cells 223, the data migration operation may be performed without requiring garbage collection performed by the storage device 200.

Figure 8:
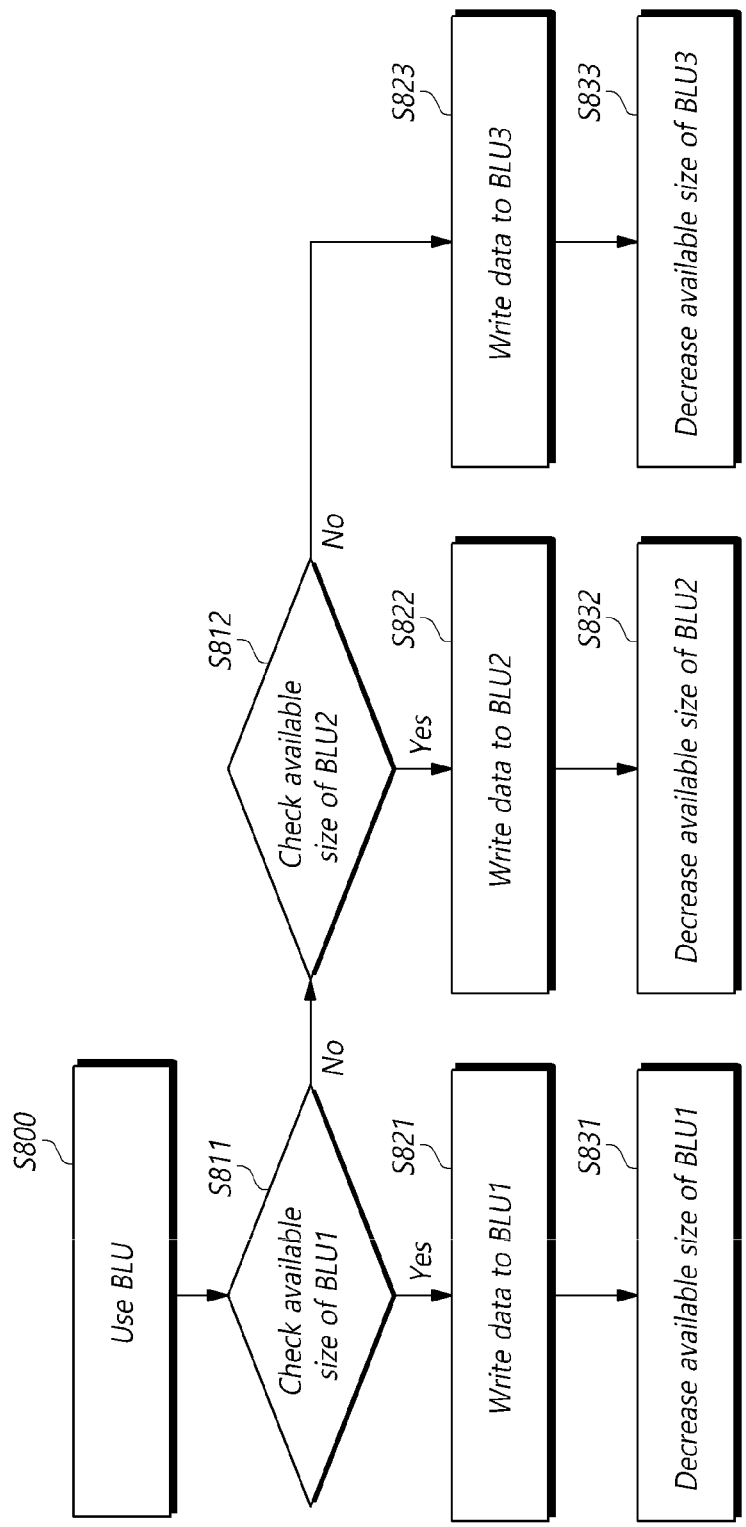
FIGS. 8 and 9 are flowcharts illustrating a method for the host device to control an operation of writing data using the booster logic unit.
Figure 9:
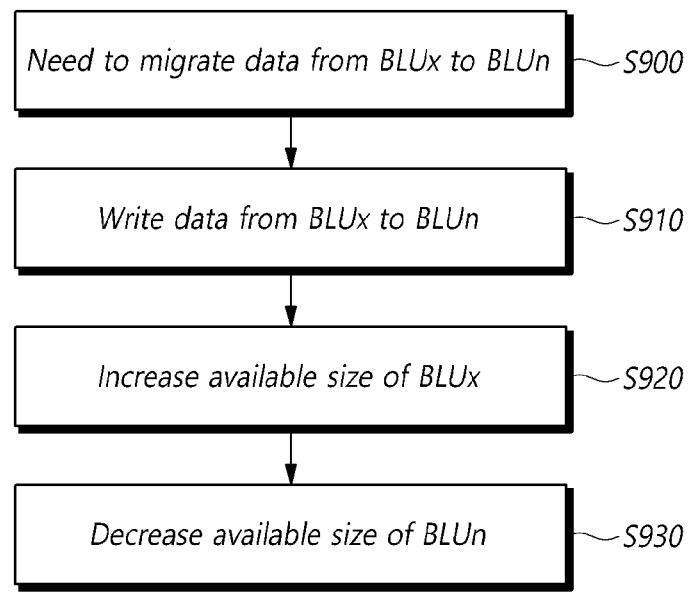

FIGS. 8 and 9 illustrate a method for the host device 100 to control an operation of writing data using the booster logic unit 120 according to an embodiment of the disclosed technology.

Referring to FIG. 8, the host device 100 may use the booster logic unit 120 to control a data writing operation to the memory 220 including various types of memory cells (S800).

The host device 100 may check a size available in the first booster logic unit 121 (S811).

When the size available in the first booster logic unit 121 is sufficient to write the data to the first booster logic unit 121, the host device 100 may perform the data writing operation on the first booster logic unit 121 (S821). Accordingly, the data may be written to at least a part of the plurality of first memory cells 221 corresponding to the first booster logic unit 121.

After that, the host device 100 may decrease the available size of the first booster logic unit 121 (S831).

When the size available in the first booster logic unit 121 is not sufficient to write the data to the first booster logic unit 121, the host device 100 may check a size available in the second booster logic unit 122 (S812).

When the size available in the second booster logic unit 122 is sufficient to write the data to the second booster logic unit 122, the host device 100 may perform the data write operation on the second booster logic unit 122 (S822). Accordingly, the data may be written to at least a part of the plurality of second memory cells 222 corresponding to the second booster logic unit 122.

After that, the host device 100 may decrease the available size of the second booster logic unit 122 (S832).

When the size available in the second booster logic unit 122 is not sufficient to write the data to the second booster logic unit 122, the host device 100 may perform the data writing operation on the third booster logic unit 123 (S823). Accordingly, the data may be written to at least a part of the plurality of third memory cells 223 corresponding to the third booster logic unit 123.

After that, the host device 100 may decrease the available size of the third booster logic unit 123 (S833).

The host device 100 may control an operation of migrating data between the first to third booster logic units 121 to 123 depending on the total size of data written to the booster logic unit 120 or operational states of the host device 100 and the storage device 200.

For example, referring to FIG. 9, the host device 100 may check whether it is necessary to migrate data written to an xth booster logic unit to an nth booster logic unit (S900).

Here, n may represent the maximum number of bits that can be stored in a memory cell included in the memory 220. For example, if a memory cell included in the memory 220 can store a maximum of 4 bits of data, n may be 4.

x may be a number smaller than n. For example, x may be 1 or 3, but is not limited thereto.

The host device 100 may migrate data written to the xth booster logic unit, which corresponds to memory cells such as single level cells or triple level cells, to the nth booster logic unit, which corresponds to memory cells such as quad level cells (S910).

During a preset period or when the total size of data written to the xth booster logic unit is equal to or larger than a preset threshold value, the host device 100 may perform an operation of migrating the data written to the xth booster logic unit to the nth booster logic unit.

As the data written to the xth booster logic unit is migrated to the nth booster logic unit, data written to memory cells corresponding to the xth booster logic unit may be migrated to memory cells corresponding to the nth booster logic unit.

After that, the host device 100 may increase a size available in the xth booster logic unit (S920). The host device 100 may decrease a size available in the nth booster logic unit (S930).

Since the host device 100 may control, using the booster logic unit 120, an operation of writing data to a memory that includes different types of memory cells, it is possible to prevent performance degradation caused by writing data to memory cells with different characteristics in terms of write operations.

Since the host device 100 manages a data writing operation to different types of memory cells and determines a time period for writing data to the different types of memory cells, it is possible to reduce the workload on the storage device 200. Thus, performance and efficiency of a data writing operation to the memory 220 including two or at least three different types of memory cells may be improved.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the disclosed technology as defined in the following claims.

What is claimed is:

1. A computing system comprising:
   a storage device including a plurality of first memory cells, each storing K-bit data, and a plurality of second memory cells, each storing N-bit data, K being smaller than N, N being equal to or greater than 2; and
   a host device including a first booster logic unit that is set to correspond to the plurality of first memory cells and a second booster logic unit that is set to correspond to the plurality of second memory cells, and configured to control a data writing operation of writing data to the plurality of first memory cells or the plurality of second memory cells based on a size available in at least one of the first booster logic unit or the second booster logic unit.

2. The computing system according to claim 1, wherein, when the size available in the first booster logic unit is equal to or larger than a size of data to be written, the host device controls the data writing operation to be perform on at least a part of the plurality of first memory cells, and decreases the size available in the first booster logic unit.

3. The computing system according to claim 2, wherein, when the size available in the first booster logic unit is smaller than the size of data to be written and the size available in the second booster logic unit is equal to or larger than the size of data to be written, the host device controls the data writing operation to be perform on at least a part of the plurality of second memory cells, and decreases the size available in the second booster logic unit.

4. The computing system according to claim 1, wherein, during a preset period, the host device migrates at least a part of data written to the first booster logic unit to the second booster logic unit.

5. The computing system according to claim 4, wherein, when the at least a part of data written to the first booster logic unit is migrated to the second booster logic unit, the storage device migrates at least a part of data written to the plurality of first memory cells to the plurality of second memory cells.

6. The computing system according to claim 4, wherein the preset period is an idle period.

7. The computing system according to claim 1, wherein the host device transmits a logic unit setting parameter including information indicating a type of memory cells to the storage device.

8. The computing system according to claim 1, wherein each of the first booster logic unit and the second booster logic unit is set according to a logic unit setting parameter including information indicating a type of memory cells.

9. The computing system according to claim 8, wherein information indicating a type of memory cells included in the logic unit setting parameter used in setting the first booster logic unit is different from information indicating a type of memory cells included in the logic unit setting parameter used in setting the second booster logic unit.

10. The computing system according to claim 1, wherein the N bits are maximum bits capable of being stored in each of memory cells included in the storage device.

11. The computing system according to claim 1, wherein
    each of the plurality of first memory cells stores 1-bit data,
    and the storage device further includes a plurality of third memory cells, each storing M-bit data, M being greater than N, and
    the host device further includes a third booster logic unit that is set to correspond to the plurality of third memory cells, and
    wherein when a size available in the first booster logic unit or a size available in the second booster logic unit is equal to or larger than a size of data to be written, the host device controls the data writing operation to be performed on at least a part of the plurality of first memory cells or at least a part of the plurality of second memory cells.

12. The computing system according to claim 11, wherein, when the size available in the first booster logic unit or the size available in the second booster logic unit is smaller than the size of data to be written, the host device controls the data writing operation to be performed on at least a part of the plurality of third memory cells.

13. The computing system according to claim 11, wherein, during a preset period, the host device migrates data written to the first booster logic unit to at least one of the second booster logic unit or the third booster logic unit.

14. The computing system according to claim 11, wherein the host device writes data to either the first booster logic unit or the second booster logic unit, and when a size of the written data is equal to or larger than a size of a block including a part of the plurality of third memory cells, the host device migrates the written data to at least a part of the plurality of third memory cells.

15. A host device comprising:
    a first booster logic unit set to correspond to a plurality of first memory cells included in a memory, each first memory cell storing 1-bit data;
    a second booster logic unit set to correspond to a plurality of second memory cells in the memory, each second memory cell storing N-bit data, N being greater than 1;
    a third booster logic unit set to correspond to a plurality of third memory cells in the memory, each third memory cell storing M-bit data, M being greater than N; and
    a booster logic control module configured to control a data writing operation of writing data to the plurality of first memory cells, the plurality of second memory cells, or the plurality of third memory cells, based on a size available in at least one of the first booster logic unit, the second booster logic unit, or the third booster logic unit.

16. The host device according to claim 15, wherein, when the size available in the first booster logic unit or the size available in the second booster logic unit is equal to or larger than a size of data to be written, the booster logic control module controls the data writing operation to be performed on at least a part of the plurality of first memory cells or at least a part of the plurality of second memory cells, and wherein, when the sizes available in the first booster logic unit and the second booster logic unit are smaller than the size of data to be written, the booster logic control module controls the data writing operation to be performed on at least a part of the plurality of third memory cells.

17. The host device according to claim 15, wherein, during a preset period, the booster logic control module migrates data written to at least one of the first booster logic unit or the second booster logic unit to the third booster logic unit.

18. The host device according to claim 15, wherein, when a total size of data written to at least one of the first booster logic unit or the second booster logic unit is equal to or larger than a preset threshold value, the booster logic control module migrates the written data to the third booster logic unit.

19. A storage device comprising:
a memory including a plurality of first memory cells, each storing K-bit data, and a plurality of second memory cells, each storing N-bit data, K being smaller than N, N being equal to or greater than 2; and
a controller configured to control a data writing operation of writing data to the plurality of first memory cells or the plurality of second memory cells in response to a command received from a host device using a first booster logic unit set to correspond to the plurality of first memory cells and a second booster logic unit set to correspond to the plurality of second memory cells, wherein the first and the second booster logic units are included in and managed by the host device.

20. The storage device according to claim 19, wherein, according to an operation in which the host device migrates data written to the first booster logic unit to the second booster logic unit, data written to the plurality of first memory cells is migrated to the plurality of second memory cells.

* * * * *